(12) United States Patent
Agrawal et al.

(10) Patent No.: US 9,606,564 B2
(45) Date of Patent: Mar. 28, 2017

(54) HYBRID ANALOG AND DIGITAL POWER CONVERTER CONTROLLER

(71) Applicant: Cree, Inc., Durham, NC (US)

(72) Inventors: Binod Kumar Agrawal, Gurgaon (IN); John Mookken, Raleigh, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/679,280

(22) Filed: Apr. 6, 2015

(65) Prior Publication Data

US 2016/0291627 A1     Oct. 6, 2016

(51) Int. Cl.
| | |
|---|---|
| *G05F 3/08* | (2006.01) |
| *H02J 3/38* | (2006.01) |
| *H02M 3/156* | (2006.01) |
| *H02M 3/157* | (2006.01) |
| *H02M 1/00* | (2006.01) |

(52) U.S. Cl.
CPC .............. *G05F 3/08* (2013.01); *H02J 3/385* (2013.01); *H02M 3/156* (2013.01); *H02M 3/157* (2013.01); *H02M 2001/0025* (2013.01)

(58) Field of Classification Search
CPC ............ H02M 7/44; H02M 1/42; H02M 3/04; H02M 3/157; H02M 3/33515; G05F 1/66; G05F 1/67; G05F 3/08; H02J 3/383; H02J 3/382; H02J 3/385
See application file for complete search history.

(56) References Cited

U.S. PATENT DOCUMENTS 4,383,183 A * 5/1983 Schlenk .................. H02J 1/102
307/43

2003/0038612 A1 * 2/2003 Kutkut .............. H02M 3/33561
320/140
2004/0124716 A1 * 7/2004 Shirato ................. H02J 7/0065
307/130

(Continued)

FOREIGN PATENT DOCUMENTS

| | | |
|---|---|---|
| EP | 2469680 A2 | 6/2012 |
| EP | 2551986 A1 | 1/2013 |

OTHER PUBLICATIONS

Choudhury, S., "Digitally Controlled HV Solar MPPT DC-DC Converter Using C2000™ Piccolo™ Microcontroller," Application Report SPRABR6, May 2013, Texas Instruments Incorporated, 26 pages.
Esram, T. et al., "Comparison of Photovoltaic Array Maximum Power Point Tracking Techniques," IEEE Transactions on Energy Conversion, vol. 22, No. 2, Jun. 2007, IEEE, pp. 439-449.
Lynch, B.T., "Under the Hood of a DC/DC Boost Converter," TI Power Supply Design Seminar (SEM1800), 2008/2009, Dallas, Texas, http://www.ti.com/download/trng/docs/seminar/Topic_3_Lynch.pdf, 26 pages.

(Continued)

*Primary Examiner* — Gustavo Rosario Benitez
(74) *Attorney, Agent, or Firm* — Anthony J. Josephson

(57) ABSTRACT

A control system for a power converter includes a digital reference signal generator, a first proportional-integral (PI) controller, a second PI controller, and a diode. The digital reference signal generator is configured to operate in a maximum peak power tracking (MPPT) mode of operation and an output voltage control mode of operation. In the MPPT mode of operation, the digital reference signal generator is configured to receive an input voltage and an input current provided to the power converter and provide an input voltage reference signal based on the input voltage and the input current. In the output voltage control mode of operation, the digital reference signal generator is configured to provide a constant input voltage reference signal.

22 Claims, 4 Drawing Sheets

(56) References Cited

U.S. PATENT DOCUMENTS

| | | | | |
|---|---|---|---|---|
| 2005/0162662 A1* | 7/2005 | Sauerland | .......... | G01B 11/0691 |
| | | | | 356/502 |
| 2012/0075898 A1* | 3/2012 | Sigamani | .................. | G05F 1/67 |
| | | | | 363/131 |
| 2013/0155739 A1* | 6/2013 | Itako | ......................... | G05F 1/67 |
| | | | | 363/95 |
| 2014/0319920 A1* | 10/2014 | Kuboyama | ............. | H02J 3/385 |
| | | | | 307/82 |
| 2015/0092462 A1* | 4/2015 | Ohori | ...................... | H02M 7/44 |
| | | | | 363/71 |
| 2015/0365014 A1* | 12/2015 | Lin | ......................... | H02M 7/44 |
| | | | | 363/40 |

OTHER PUBLICATIONS

Peftitsis, D. et al., "Photovoltaic system MPPTracker investigation and implementation using DSP engine and buck—boost DC-DC converter," 13th Power Electronics and Motion Control Conference (EPE-PEMC), Sep. 1-3, 2008, Poznan, Poland, IEEE, pp. 1840-1846.

Ridley, R.B., "Boost Converter with Current-Mode Control," Power Supply Control Design Tools—Part 4, Jun. 20, 2012, Ridley Engineering, 2 pages.

Tseng, S.-Y. et al., "A Photovoltaic Power System Using a High Step-up Converter for DC Load Applications," Energies, vol. 6, Issue 2, Feb. 2013, MDPI, pp. 1068-1100.

International Search Report and Written Opinion for International Patent Application No. PCT/US2016/026155, mailed Jul. 28, 2016, 10 pages.

* cited by examiner

HYBRID ANALOG AND DIGITAL POWER CONVERTER CONTROLLER

FIELD OF THE DISCLOSURE

The present disclosure relates to power converter control systems, and in particular, to mixed analog and digital power converter control systems.

BACKGROUND

There are several different types of control systems that may be used along with a power converter. One common type of control system for a power converter is a peak current mode (PCM) control system, which generally utilizes analog components to provide control signals to a power converter such that desired output performance is achieved. While generally effective in many applications, PCM control systems are difficult to apply when utilizing a variable power source such as a renewable energy source (e.g., photovoltaic cells, fuel cells, and wind generators). Accordingly, maximum peak power tracking (MPPT) control systems have been utilized in these applications in place of PCM control systems.

Due to the nature of the calculations performed in MPPT control systems, such control systems are often implemented in digital systems such as microprocessors and/or digital signal processors (DSPs). Generally, MPPT control systems use a perturb-and-observe control scheme in order to provide control signals to a power converter such that a maximum possible amount of power is achieved at an output of the power converter. However, digital (e.g., DSP based) MPPT control systems generally suffer from a reduced bandwidth and a relatively slow transient response time to external events such as a change in load impedance when compared to conventional analog control systems. Further, digital MPPT control systems are relatively time consuming to design and implement in comparison to conventional analog control systems.

Accordingly, there is a need for a control system for a power converter that is capable of implementing an MPPT control scheme while simultaneously including an improved transient response time and wide bandwidth.

SUMMARY

The present disclosure relates to power converter control systems, and in particular, to mixed analog and digital power converter control systems configured for use with one or more renewable energy sources. In one embodiment, a control system for a power converter includes a digital reference signal generator, a first proportional-integral (PI) controller, a second PI controller, and a diode. The digital reference signal generator is configured to operate in a maximum peak power tracking (MPPT) mode of operation and an output voltage control mode of operation. In the MPPT mode of operation, the digital reference signal generator is configured to receive an input voltage and an input current provided to the power converter and provide an input voltage reference signal based on the input voltage and the input current. In the output voltage control mode of operation, the digital reference signal generator is configured to provide a constant input voltage reference signal. The first PI controller is coupled to an output of the digital reference signal generator and configured to receive the input voltage reference signal and the input voltage. Further, the first PI controller is configured to provide a first PI control signal at a first PI controller output based on the input voltage reference signal and the input voltage. The second PI controller is configured to receive a constant output voltage reference signal and an output voltage from the power converter and provide a second PI control signal at a second PI controller output based on the constant output voltage reference signal and the output voltage. The diode includes an anode coupled to the first PI controller output and a cathode coupled to the second PI controller output, such that the anode of the diode forms a control system output. By using the digital reference signal as described above along with the first PI controller and the second PI controller, a combination of digital and analog control can be achieved by the control system, thereby increasing the performance of a power converter used with the power converter control system.

In one embodiment, the digital reference signal generator is further configured to receive an output voltage from the power converter and select between the MPPT mode of operation and the output voltage control mode of operation based on the output voltage and the currently selected mode of operation of the digital reference signal generator.

In one embodiment, in the MPPT mode of operation of the digital reference signal generator, the diode is reverse biased such that the first PI control signal is provided at the control system output. Further, in the output voltage control mode of operation, the diode is forward biased such that the second PI control signal is provided at the control system output.

In one embodiment, a power converter system includes a power converter, a digital reference signal generator, a first PI controller, a second PI controller, and a diode. The power converter is configured to receive an input voltage and an input current and provide an output voltage. The digital reference signal generator is configured to operate in a maximum peak power tracking (MPPT) mode of operation and an output voltage control mode of operation. In the MPPT mode of operation, the digital reference signal generator is configured to receive the input voltage and the input current and provide an input voltage reference signal based on the input voltage and the input current. In the output voltage control mode of operation, the digital reference signal generator is configured to provide a constant input voltage reference signal. The first PI controller is coupled to an output of the digital reference signal generator and configured to receive the input voltage reference signal and the input voltage. Further, the first PI controller is configured to provide a first PI control signal at a first PI controller output based on the input voltage reference signal and the input voltage. The second PI controller is configured to receive a constant output voltage reference signal and an output voltage from the power converter and provide a second PI control signal at a second PI controller output based on the constant output voltage reference signal and the output voltage. The diode includes an anode coupled to the first PI controller output and a cathode coupled to the second PI controller output, such that the anode of the diode forms a control system output, which is coupled to the power converter. By using the digital reference signal as described above along with the first PI controller and the second PI controller, a combination of digital and analog control can be achieved by the control system, thereby increasing the performance of a power converter used with the power converter control system.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
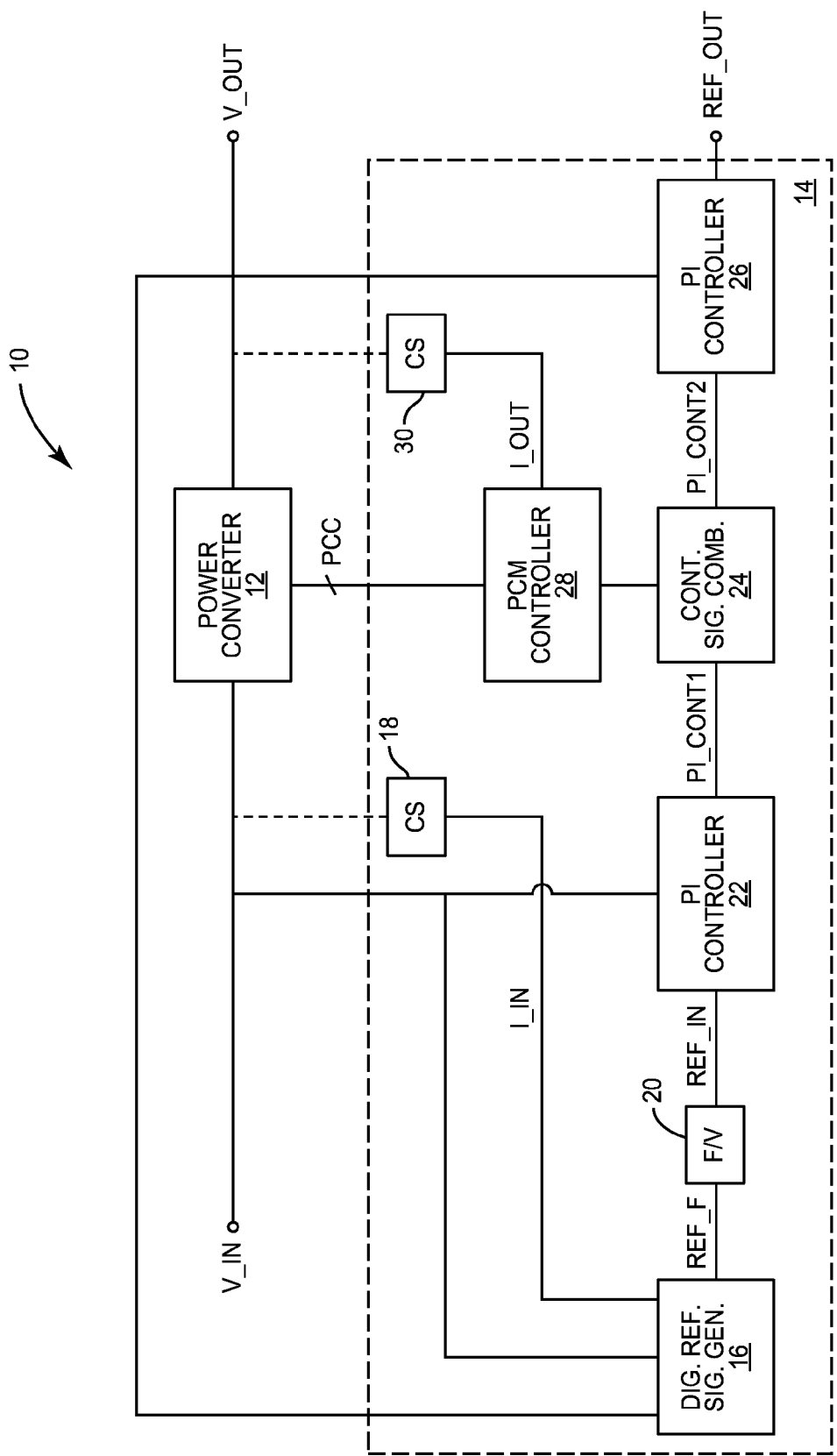
FIG. 1 is a block diagram illustrating a power converter system according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows a power converter system 10 according to one embodiment of the present disclosure. The power converter system 10 includes a power converter 12 and a power converter control system 14. The power converter 12 is configured to receive an input voltage V_IN and provide an output voltage V_OUT, which has been conditioned and/or converted. The power converter 12 may be any type of power converter, such as a boost converter, a buck converter, a buck-boost converter, or the like. The power converter control system 14 is configured to receive the input voltage V_IN, an input current I_IN, the output voltage V_OUT, and an output current I_OUT, and provide one or more power converter control signals FCC to the power converter 12 in order to control the operation thereof.

The power converter control system 14 includes a digital reference signal generator 16, which is configured to receive the input voltage V_IN, the input current I_IN via an input current sensor 18, and the output voltage V_OUT and provide a reference frequency REF_F based on one of an maximum peak power tracking (MPPT) control scheme or an output voltage control scheme. The reference frequency REF_F is received by a frequency-to-voltage (F/V) converter 20, which converts the reference frequency REF_F into a reference input voltage REF_IN. The reference input voltage REF_IN is provided to a first proportional-integral (PI) controller 22, where it is used along with the input voltage V_IN to provide a first PI control signal PI_CONT1 to a control signal combiner 24.

A second PI controller 26 receives a reference output voltage REF_OUT, which is a constant reference voltage that may be provided by any number of external sources, and the output voltage V_OUT. The second PI controller 26 uses the reference output voltage REF_OUT and the output voltage V_OUT to provide a second PI control signal PI_CONT2, which is provided to the control signal combiner 24. An output of the control signal combiner 24 is coupled to a peak current mode (PCM) controller 28, which is in turn coupled to the power converter 12. The PCM controller 28 is configured to receive the output current I_OUT via an output current sensor 30 and a control signal from the control signal combiner 24 and provide one or more power converter control signals FCC to the power converter 12 based thereon. The power converter control signals PCC may control the magnitude of the output voltage V_OUT, the output current I_OUT, or both. In some embodiments, the PCM controller 28 may be any number of pre-packaged power converter controllers, which generally operate based on a single control signal input. For example, the PCM controller 28 may be part number UCC28220 from Texas Instruments of Dallas, Tex.

As discussed above, the digital reference signal generator 16 is configured to operate in an MPPT mode of operation and an output voltage control mode of operation. In the MPPT mode of operation of the digital reference signal generator 16, the digital reference signal generator 16 is configured to provide the reference frequency REF_F, and thus the reference input voltage REF_IN, based on the input voltage V_IN and the input current I_IN. In the MPPT mode of operation of the digital reference signal generator 16, the control signal combiner 24 provides the first PI control signal PI_CONT1 to the PCM controller 28.

In the output voltage control mode of operation, the digital reference signal generator 16 is configured to provide a constant reference frequency REF_F such that the reference input voltage REF_IN is a constant signal. Specifically, the digital reference signal generator 16 provides a relatively high reference frequency REF_F (e.g., 4 kHz) in order to drive the reference input voltage REF_IN and thus the first PI control signal PI_CONT1 to its maximum value. As discussed in detail below, driving the first PI control signal PI_CONT1 to its maximum value causes the control signal combiner 24 to provide the second PI control signal PI_CONT2 to the PCM controller 28, as discussed in detail below. Accordingly, the power converter control system 14 may change from an MPPT control scheme to an output voltage control scheme.

Figure 2:
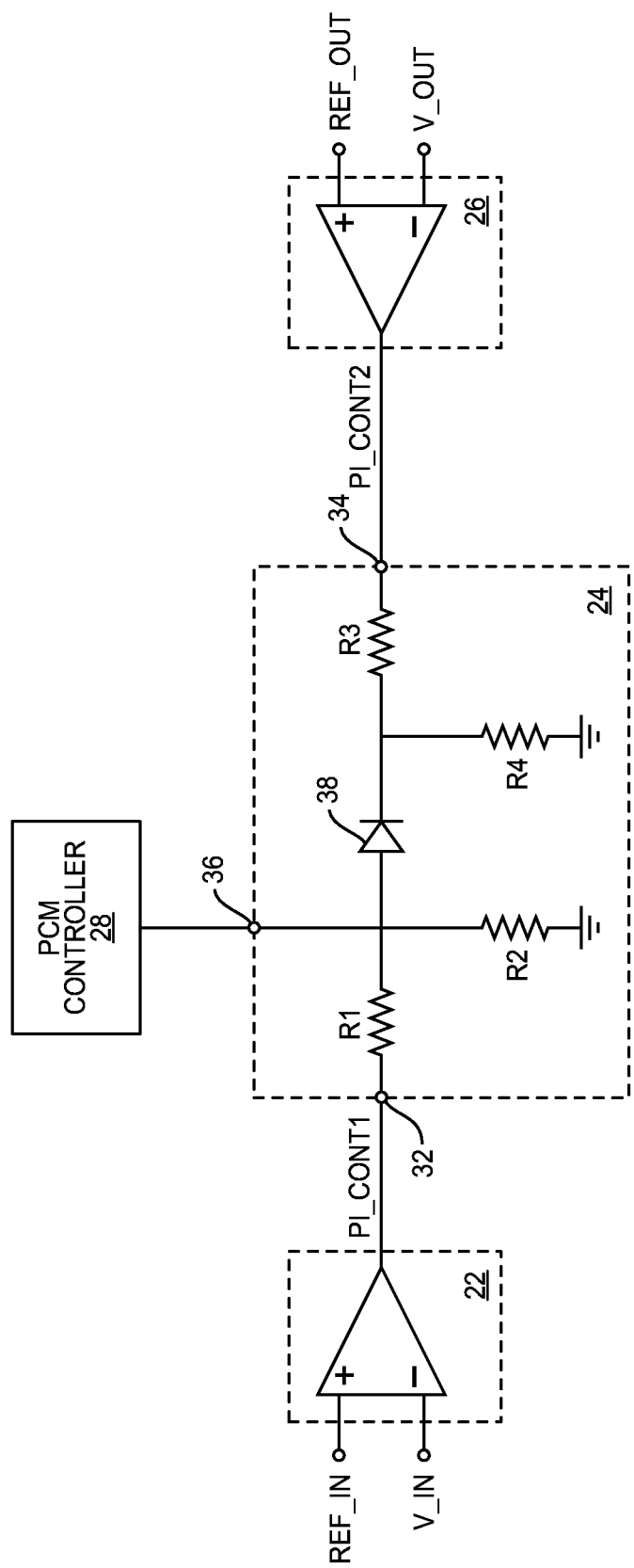
FIG. 2 illustrates details of a first proportional-integral (PI) controller and a second PI controller in the power converter system shown in FIG. 1 according to one embodiment of the present disclosure.

FIG. 2 shows details of the control signal combiner 24 according to one embodiment of the present disclosure. The first PI controller 22 and the second PI controller 26 are also shown for context. As shown in FIG. 2, an output of the first PI controller 22 is coupled to a first input 32 of the control signal combiner 24. An output of the second PI controller 26 is coupled to a second input 34 of the control signal combiner 24. The control signal combiner 24 further includes an output 36, which is coupled to an input of the PCM controller 28. As discussed above, the control signal combiner 24 provides one of the first PI control signal PI_CONT1 or the second PI control signal PI_CONT2 to the PCM controller 28. The first input 32 of the control signal combiner 24 is coupled to the output 36 via a first resistor R1. Further, the output 36 of the control signal combiner 24 is coupled to ground via a second resistor R2. A diode 38 in the control signal combiner 24 includes an anode coupled to the output 36 and a cathode coupled to the second input 34 via a third resistor R3. Further, the cathode of the diode 38 is coupled to ground via a fourth resistor R4.

In operation, in the MPPT mode of operation of the power converter control system 14, the digital reference signal generator 16 provides the reference frequency REF_F according to an MPPT control scheme using the input voltage V_IN and the input current I_IN, as discussed in detail below. In the MPPT mode of operation of the power converter control system 14, the diode 38 remains reverse biased because the threshold voltage of the diode 38 is not exceeded. Accordingly, only the first PI control signal PI_CONT1 is provided to the PCM controller 28. In the output voltage control mode of operation of the power converter control system 14, the digital reference signal generator 16 provides the reference frequency REF_F as a fixed frequency. Specifically, the digital reference signal generator 16 provides a high frequency fixed signal (e.g., a 4 kHZ sinusoidal signal) as the reference frequency REF_F, which drives the first PI control signal PI_CONT1 to a maximum value. The maximum value of the first PI control signal PI_CONT1 causes the diode 38 to become forward biased. When the diode 38 becomes forward biased, the second PI control signal PI_CONT2, which is based on the output voltage V_OUT, modulates a current through the first resistor R1 and the second resistor R2, which modulates the signal provided to the PCM controller 28 such that the PCM controller 28 is controlled via the output voltage V_OUT of the power converter 12.

In one embodiment, the diode 38 is a low drop diode, such that a forward voltage drop across the diode is less than about 0.1V. In various embodiments, the diode 38 may be a silicon (Si) Schottky diode. When the diode 38 becomes forward biased in the output voltage control mode as discussed above, the voltage across the fourth resistor R4 (ideally) should be the same as the voltage at the output 36 of the control signal combiner 24. However it is the drop across diode 38 which adds to that voltage. This is the reason that the diode 38 should be a low drop diode to minimize that error.

Figure 3:
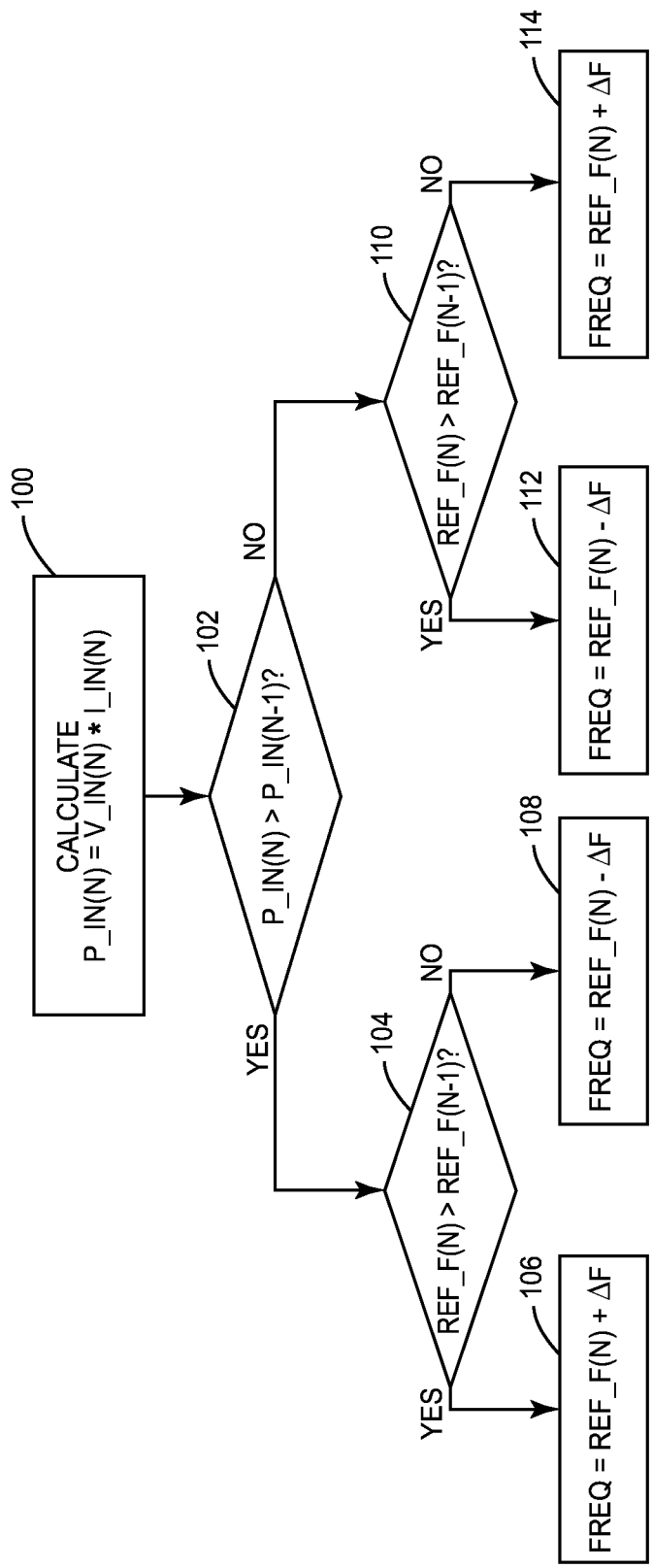
FIG. 3 is a flow diagram illustrating a maximum peak power tracking (MPPT) control scheme according to one embodiment of the present disclosure.

FIG. 3 is a flow chart illustrating the MPPT control scheme described above according to one embodiment of the present disclosure. Specifically, FIG. 3 illustrates a perturb and observe (P&O) MPPT control scheme, which may be used in various embodiments of the present disclosure. The MPPT control scheme may be used by the digital reference signal generator 16 to provide the reference frequency REF_F based on the input voltage V_IN and the input current I_IN. First, an instantaneous input power P_IN(N) is calculated as P_IN(N)=V_IN(N)*I_IN(N) (step 100). A determination is then made whether the instantaneous input power P_IN(N) is greater than a previously calculated input power P_IN(N−1) (step 102). If the instantaneous input power P_IN(N) is greater than the previous calculated input power P_IN(N−1), a determination is made whether the instantaneous reference frequency REF_F(N) is greater than a previous reference frequency REF_F(N−1) (step 104). If the instantaneous reference frequency REF_F(N) is greater than the previous reference frequency REF_F(N−1), the reference frequency REF_F is increased by a certain amount ΔF (step 106). If the instantaneous reference frequency REF_F(N) is less than the previous reference frequency REF_F(N−1), the reference frequency REF_F is decreased by a certain amount ΔF (step 108). If the instantaneous input power P_IN(N) is less than the previously calculated input power P_IN(N−1), a determination is then made whether the instantaneous reference frequency REF_F(N) is greater than a previous reference frequency REF_F(N−1) (step 110). If the instantaneous reference frequency REF_F(N) is greater than the previous reference frequency REF_F(N−1), the reference frequency REF_F is decreased by a certain amount ΔF (step 112). If the instantaneous reference frequency REF_F(N) is less than the previous reference frequency REF_F(N−1), the reference frequency REF_F is increased by a certain amount ΔF (step 114). The reference frequency REF_F is converted into the reference input voltage REF_IN by the F/V converter 20, as discussed above. The first PI controller 22 then provides the first PI control signal PI_CONT1 based on the reference input voltage REF_IN, such that the PCM controller 28 provides the power converter control signals PCC based on an MPPT control scheme.

While a P&O MPPT control scheme is illustrated in FIG. 3, any MPPT control scheme may be used in order to provide the reference frequency REF_F without departing from the principles of the present disclosure. For example, an incremental conductance MPPT control scheme, a current sweep MPPT control scheme, a constant voltage MPPT control scheme, or the like may be used by the digital reference signal generator 16 without departing from the principles of the present disclosure.

In the output voltage control mode of the power converter control system 14, the second PI control signal PI_CONT2, which is based on the output voltage OUT_V, is provided to the PCM controller 28. Accordingly, the PCM controller 28 will provide the power converter control signals FCC based on a conventional PCM control scheme, the details of which will be appreciated by those of ordinary skill in the art.

Figure 4:
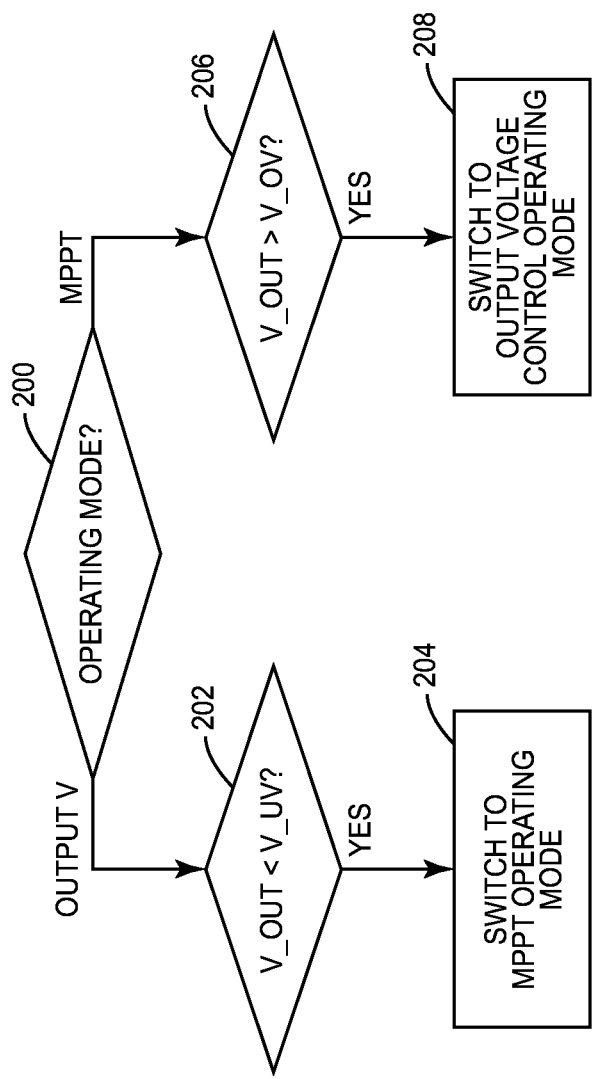
FIG. 4 is a flow diagram illustrating a combined MPPT control scheme and output voltage control scheme according to one embodiment of the present disclosure.

FIG. 4 is a flow diagram illustrating the decision process for the digital reference signal generator 16 to switch between the MPPT mode of operation and the output voltage control mode of operation. First, a decision is made based on which mode the digital reference signal generator 16 is currently operating (step 200). If the digital reference signal generator 16 is currently operating in the output voltage control mode of operation, a determination is then made whether the output voltage V_OUT is less than a predetermined under-voltage V_UV (step 202). If the output voltage V_OUT is less than the predetermined under-voltage V_UV, the mode of operation of the digital reference signal generator 16 is changed from the output voltage control mode of operation to the MPPT mode of operation (step 204). If the digital reference signal generator 16 is currently operated in the MPPT mode of operation, a determination is then made whether the output voltage V_OUT is above a predetermined over-voltage V_OV (step 206). If the output voltage V_OUT is above the predetermined over-voltage V_OV, the mode of operation of the digital reference signal generator 16 is changed from the MPPT mode of operation to the output voltage control mode of operation (step 208). Accordingly, the digital reference signal generator 16 may switch modes in order to control the power converter control system 14 as desired.

The predetermined under-voltage V_UV and the predetermined overvoltage V_OV may be adjusted based on the particular needs of the power converter 12. Further, the digital reference signal generator 16 may use any suitable method for switching between operating modes without departing from the principles of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. A control system for a power converter comprising:
    a digital reference signal generator configured to:
        in a maximum peak power tracking (MPPT) mode of operation, receive an input voltage and an input current provided to the power converter and provide an input voltage reference signal based on the input voltage and the input current; and
        in an output voltage control mode of operation, provide a constant input voltage reference signal;
    a first proportional-integral (PI) controller coupled to the digital reference signal generator and configured to receive the input voltage reference signal and the input voltage and provide a first PI control signal at a first PI controller output based on the input voltage reference signal and the input voltage;
    a second PI controller configured to receive a constant output voltage reference signal and an output voltage from the power converter and provide a second PI control signal at a second PI controller output based on the constant output voltage reference signal and the output voltage; and
    a diode including an anode coupled to the first PI controller output and a cathode coupled to the second PI controller output, wherein the anode of the diode forms a control system output.

2. The control system of claim 1 wherein the digital reference signal generator is further configured to receive the output voltage from the power converter and select between the MPPT mode of operation and the output voltage control mode of operation based on the output voltage and a currently selected mode of operation of the digital reference signal generator.

3. The control system of claim 2 wherein:
    in the MPPT mode of operation of the digital reference signal generator, the diode is reverse biased such that the first PI control signal is provided at the control system output; and
    in the output voltage control mode of operation of the digital reference signal generator, the diode is forward biased such that the first PI control signal and the second PI control signal are provided at the control system output, and the first PI control signal is a constant voltage.

4. The control system of claim 1 wherein:
    in the MPPT mode of operation of the digital reference signal generator, the diode is reverse biased such that the first PI control signal is provided at the control system output; and
    in the output voltage control mode of operation of the digital reference signal generator, the diode is forward biased such that the first PI control signal and the second PI control signal are provided at the control system output, and the first PI control signal is a constant voltage.

5. The control system of claim 2 further comprising a peak current mode (PCM) controller coupled to the control system output and configured to provide at least one power converter control signal to the power converter based on one of the first PI control signal and the second PI control signal.

6. The control system of claim 5 wherein the at least one power converter control signal is a pulse width modulated (PWM) signal.

7. The control system of claim 1 wherein in the MPPT mode of operation, the digital reference signal generator is configured to provide the input voltage reference signal based on a perturb and observe control scheme using the input voltage and the input current.

8. The control system of claim 1 wherein the first PI controller is an operational amplifier comprising a non-inverting input configured to receive the input voltage reference signal, an inverting input configured to receive the input voltage, and the first PI controller output.

9. The control system of claim 8 wherein the second PI controller is an operational amplifier comprising a non-inverting input configured to receive the constant output voltage reference signal, an inverting input configured to receive the output voltage, and the second PI controller output.

10. The control system of claim 1 wherein the diode is a low drop diode with a forward voltage drop less than about 0.1V.

11. A power converter system comprising:
a power converter configured to receive an input voltage and an input current and provide an output voltage;
a digital reference signal generator configured to:
in a maximum peak power tracking (MPPT) mode of operation, receive the input voltage and the input current provided to the power converter and provide an input voltage reference signal based on the input voltage and the input current; and
in an output voltage control mode of operation, provide a constant input voltage reference signal; and
a first proportional-integral (PI) controller coupled to the digital reference signal generator and configured to receive the input voltage reference signal and the input voltage and provide a first PI control signal at a first PI controller output based on the input voltage reference signal and the input voltage;
a second PI controller configured to receive a constant output voltage reference signal and the output voltage and provide a second PI control signal at a second PI controller output based on the constant output voltage reference signal and the output voltage; and
a diode including an anode coupled to the first PI controller output and a cathode coupled to the second PI controller output, wherein the anode of the diode forms a control system output, which is coupled to an input of a peak current mode (PCM) controller.

12. The power converter system of claim 11 wherein the digital reference signal generator is further configured to receive the output voltage from the power converter and select between the MPPT mode of operation and the output voltage control mode of operation based on the output voltage and a currently selected mode of operation of the digital reference signal generator.

13. The power converter system of claim 12 wherein:
in the MPPT mode of operation of the digital reference signal generator, the diode is reverse biased such that the first PI control signal is provided at the control system output; and
in the output voltage control mode of operation of the digital reference signal generator, the diode is forward biased such that the first PI control signal and the second PI control signal are provided at the control system output, and the first PI control signal is a constant voltage.

14. The power converter system of claim 11 wherein:
in the MPPT mode of operation of the digital reference signal generator, the diode is reverse biased such that the first PI control signal is provided at the control system output; and
in the output voltage control mode of operation of the digital reference signal generator, the diode is forward biased such that the first PI control signal and the second PI control signal are provided at the control system output, and the first PI control signal is a constant voltage.

15. The power converter system of claim 12 wherein an output of the PCM controller is coupled to a control signal input of the power converter and the PCM controller is configured to provide at least one power converter control signal to the power converter based on one of the first PI control signal and the second PI control signal.

16. The power converter system of claim 15 wherein the at least one power converter control signal is a pulse width modulated (PWM) signal.

17. The power converter system of claim 11 wherein in the MPPT mode of operation, the digital reference signal generator is configured to provide the input voltage reference signal based on a perturb and observe control scheme using the input voltage and the input current.

18. The power converter system of claim 11 wherein the first PI controller is an operational amplifier comprising a non-inverting input configured to receive the input voltage reference signal, an inverting input configured to receive the input voltage, and the first PI controller output.

19. The power converter system of claim 18 wherein the second PI controller is an operational amplifier comprising a non-inverting input configured to receive the constant output voltage reference signal, an inverting input configured to receive the output voltage, and the second PI controller output.

20. The power converter system of claim 11 wherein the power converter is one of a buck power converter, a boost power converter, and a buck-boost power converter.

21. The power converter system of claim 20 further comprising a renewable energy source coupled to an input of the power converter and configured to provide the input voltage and the input current.

22. The power converter system of claim 11 wherein the diode is a low drop diode with a forward voltage drop less than about 0.1V.

* * * * *